United States Patent

Yang

[11] Patent Number: 5,680,019
[45] Date of Patent: Oct. 21, 1997

[54] REVERSE PROPORTIONAL VOLTAGE ADJUSTING CIRCUIT SYSTEM

[76] Inventor: Tai-Her Yang, No. 32 Lane 29, Taipin St., Si-Hu Town, Dzan-Hwa, Taiwan

[21] Appl. No.: 557,623

[22] Filed: Nov. 14, 1995

[51] Int. Cl.⁶ .................................................. H02H 7/08
[52] U.S. Cl. .................. 318/146; 318/140; 318/430; 318/254
[58] Field of Search .............................. 318/146–160, 318/140, 645, 823; 307/47, 67; 187/293; 290/40 R, 4 R; 322/29

[56] References Cited

U.S. PATENT DOCUMENTS

| | | | |
|---|---|---|---|
| 3,648,138 | 3/1972 | Kalis | 318/801 |
| 3,665,495 | 5/1972 | Carter et al. | 307/67 |
| 4,335,429 | 6/1982 | Kawakatsu | 364/424 |
| 4,806,841 | 2/1989 | Lee et al. | 322/29 |
| 4,879,501 | 11/1989 | Haner | 318/645 |
| 4,952,852 | 8/1990 | Bando et al. | 318/140 |
| 4,982,147 | 1/1991 | Lauw | 318/729 |
| 5,081,368 | 1/1992 | West | 307/67 |
| 5,512,811 | 4/1996 | Latos et al. | 322/10 |

*Primary Examiner*—Paul Ip
*Attorney, Agent, or Firm*—Bacon & Thomas

[57] ABSTRACT

An adjusting motor is connected in series with a load and power supply to thereby adjust the voltage across the load, the speed of the motor being responsive to changes in the load voltage, and the load voltage in turn being adjusted as a result of changes in the counter electro-motive force or impedance of the motor. Further control of the voltage adjustment provided by the motor can be obtained by adding an auxiliary generator or a mechanical load to control the response of the motor to voltage changes in the load. Even further control of the voltage adjustment can be obtained by adding an adjustable power load to the auxiliary generator, and by controlling the motor or auxiliary generator based on feedback of load voltage or adjusting motor current levels to a central controller and electrical machine control device, and/or by making the controller responsive to input or set values.

15 Claims, 1 Drawing Sheet

REVERSE PROPORTIONAL VOLTAGE ADJUSTING CIRCUIT SYSTEM

BACKGROUND OF THE INVENTION

Conventional voltage adjusting circuits usually employ mechanical or solid state components, linear components such as resistors, or impedance components such as inductors or capacitors, matched with solid state analog or solid state switching components such as power transistors or thyristors. In such circuits, voltage adjustment is achieved by current distribution control or by series combining the power transistor or thyristor and the load to further control the loading end voltage or current. However, switching-component-based circuits are disadvantageous because the use of switching components results in a large output power pulsation rate and such circuits are easily prone to generate noise, while analog-component-based circuits are disadvantageous because the adjuster component of such a circuit has a high heat loss.

SUMMARY OF THE INVENTION

A reverse proportional voltage adjusting circuit employs a DC or AC adjusting motor connected in series with the load as an adjuster devise. The adjusting motor can be used to adjust the main loading end voltage by allowing its speed and counter-electromotive force or impedance to freely vary in response to impedance changes in the load, or the adjusting motor can be further provided with a mechanical or electrical adjusting load to actively adjust the end voltage of the main load by controlling the impedance capacity of the adjusting load.

In the case where the adjusting motor is further provided with a mechanical or electrical adjusting load, the adjusting load can be implemented as follows: 1) by a mechanical load; 2) by employing the adjusting motor to drive an auxiliary generator, which provides generated power to an adjusting power load, and by controlling the power generation of capacity of the auxiliary generator; 3) by feeding back power from the auxiliary generator driven by the motor to the power sources, and controlling the feedback power capacity of the auxiliary generator to control the loading end voltage. Implementation (3) of the above said implementations is, in particular, characterized by lower cost and lower losses in large power applications.

BRIEF DESCRIPTION OF THE DRAWINGS

FIG. 1 is a schematic block diagram of the reverse proportional voltage adjusting circuit of the preferred embodiment. It includes the following principal elements:

Figure 1:
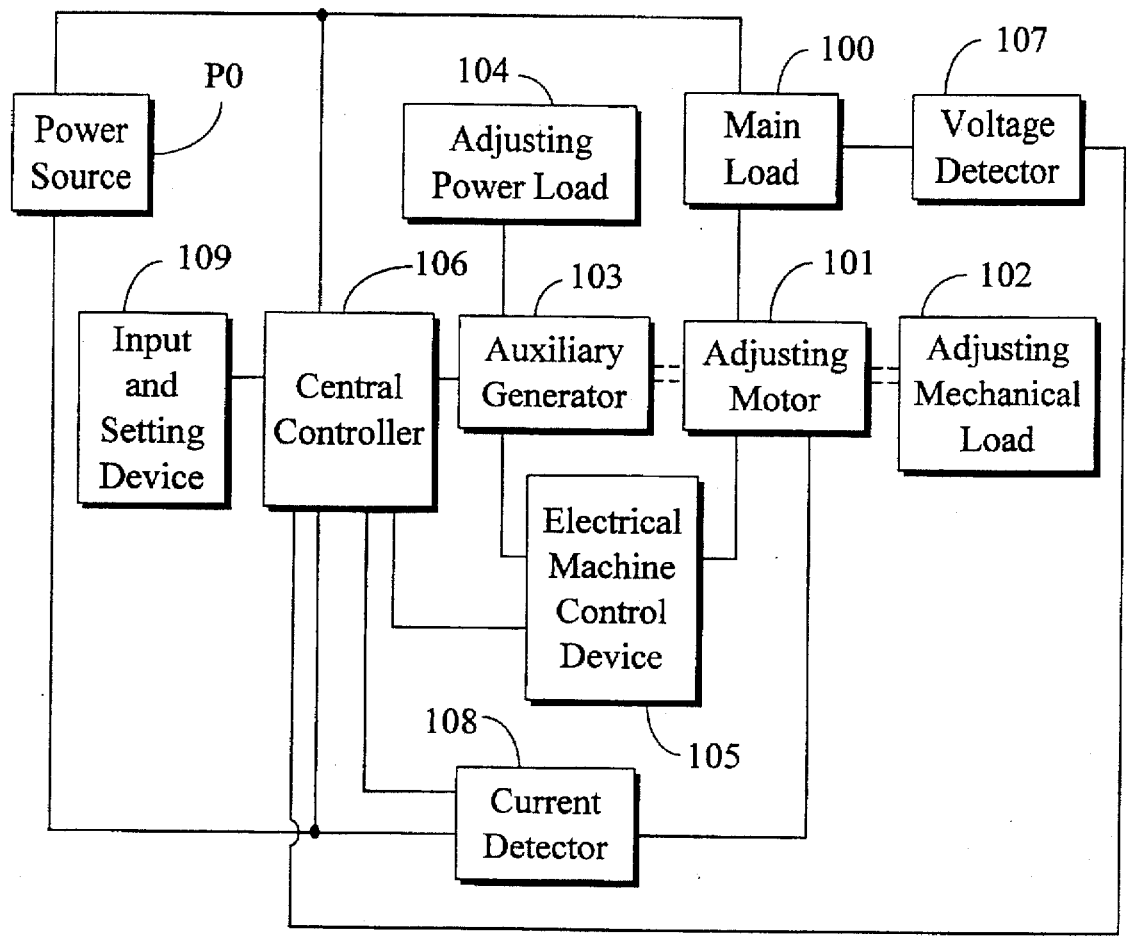
FIG. 1 is a schematic block diagram of the preferred embodiment of the invention.

A power source PO, in the form of an AC or DC power source which is series connected with a motor to drive the load;

A main load 100 supplied with power by power source PO, which can take the form of a resistive, capacitive or inductive load, a rotational electrical machine, or a battery matched with the power source PO;

An adjusting motor 101 in the form of an AC or DC, brushed or brushless, synchronous or asynchronous motor which is selected according to the power source PO and the type of loading power.

In addition to the above three principal elements, the circuit of the preferred embodiment may include any or all of the following auxiliary devices:

An adjusting mechanical load 102 for providing a controllable and more stable mechanical impedance structure, and which may, for example, be constituted by a fluid impedance pump, friction impedance damping device, or electromagnetic eddy current damping devices;

An auxiliary generator 103 in the form of an AC or DC, brushed or brushless, synchronous or asynchronous generator which is driven by the adjusting motor to convert the mechanical energy of the adjusting motor into the electric power;

An adjusting power load 104 in the form of a resistive thermoelectric component or a battery, load 104 having an electric power loss capacity that can be controlled to provide load damping for the auxiliary generator 103;

An electrical machine control device 105 made up of solid state or electromechanical components for controlling the driving rotation direction, rotation speed, current value, and end voltage value of the adjusting motor and to further control the corresponding effective impedance of the main load 100 and the generated power capacity of the auxiliary generator 103;

A central controller 106 made up of solid state or electromechanical circuit components, or a microprocessor and appropriate software to provide setting, calculations, and comparisons for controlling and/or driving each component of the reverse proportional voltage adjusting circuit system;

A loading voltage detector device 107 in the form of an analog or digital type voltage detector device made up of solid state or electromechanical circuit components arranged to produce analog or digital signals corresponding to a detected voltage value, which are output to the central controller 106 for corresponding control of the relevant components;

A loading current detector device 108 in the form of an analog or digital type voltage detector device made up of solid state or electromechanical circuit components arranged to produce analog or digital signals corresponding to the detected current value, which are output to the central controller 106 for corresponding control of the relevant components;

An input and setting device 109 made up of solid state or electromechanical circuit components for operating and setting the operation of the reverse proportional voltage adjusting circuit system.

The reverse proportional voltage adjusting circuit elements described above can provide the following functions:

F1: The operating speed and counter electromotive force of the adjustment motor can be made to freely vary in response to changes in the loading impedance or end voltage as a result of the series connection between the adjustment motor and load.

F2: Alternatively, the operating speed and impedance of the adjusting motor can be made to vary in response to changes in the loading impedance or end voltage.

F3: Where the auxiliary generator 103 is used, the counter electromotive force of the auxiliary generator 103 may be controlled by the electrical machine control device to actively adjust the loading end voltage or current;

F4: Alternatively, the impedance value of the auxiliary generator 103 may be controlled by the electrical machine control device to actively adjust the loading end voltage or voltage;

F5: Instead of controlling the loading end voltage or current using the auxiliary generator 103, the mechanical load damping 102 may be controlled to actively adjust the loading end voltage or current;

F6: The adjusting loading power output capacity of the auxiliary generator 103 may also be controlled by the electrical machine control device to actively adjust the loading end voltage or current;

F7: The power feedback capacity to the power source PO may be controlled by the electrical machine control device and the central controller to further actively adjust the loading end voltage or current.

With the elements shown in FIG. 1 connected in the manner indicated above to provide any of functions F1–F7, the loading properties for the adjusting motor can be selected as follows:

The main load may be series combined with the adjusting DC motor to freely follow the main loading power capacity changes, as described in F1 above;

The main load may be series combined with the adjusting AC motor to freely follow main load power capacity changes, as in F2 above;

The main load may be series combined with the adjusting motor and an electric power control device used to actively adjust the main loading end voltage or current, as in F3 and F4 above;

The main load may be series combined with the adjusting motor and mechanical damping used to actively adjust the main loading end voltage or current, as in F5 above;

The main load may be series combined with the adjusting motor and the motor used to drive the auxiliary generator, with the power output capacity of the generator being controlled through an electrical machine control device to actively adjust the main loading end voltage or current, as in F6 above;

The main load may be series combined with the adjusting motor and the motor is employed to drive the auxiliary generator, with power feedback capacity from the generator to the power source PO being controlled through the electrical machine control device and a central controller to actively adjust the main loading end voltage or current, as in F7 above.

I claim:

1. In a voltage adjusting circuit system, including a power source, means including a main load the voltage across which is to be adjusted, and means conventionally in the form of a voltage adjusting circuit for adjusting the voltage across the main load, the improvement wherein:

the voltage adjusting circuit is replaced by an adjusting motor connected in series with the main load and the power source such that the voltage across the main load varies in response to changes in a counter electromotive force or impedance of the adjusting motor, said changes in the counter electro-motive force or impedance of the adjusting motor resulting from changes in motor speed due at least in part to changes in the voltage across the main load to which the adjusting motor is series connected.

2. A voltage adjustment circuit system as claimed in claim 1, further comprising active control means for actively controlling the response of the adjusting motor to changes in the voltage across the main load.

3. A voltage adjustment circuit system as claimed in claim 1, wherein the active control means is a mechanical load driven by the adjusting motor.

4. A voltage adjustment circuit system as claimed in claim 3, wherein the mechanical load is selected from the group consisting of a fluid impedance pump, a friction impedance damping device, and an electromagnetic damping device.

5. A voltage adjusting circuit system as claimed in claim 1, wherein the active control means is an auxiliary generator driven by the adjusting motor.

6. A voltage adjusting circuit system as claimed in claim 5, wherein an output of the auxiliary generator is connected to an adjusting power load.

7. A voltage adjusting circuit system as claimed in claim 6, wherein the adjusting power load is selected from the group consisting of a resistive thermoelectric component and a battery.

8. A voltage adjusting circuit system as claimed in claim 5, wherein the active control means includes an electrical machine control device arranged to control a generated power capacity of the auxiliary generator.

9. A voltage adjusting circuit system as claimed in claim 8, wherein the electrical machine control device is further arranged to control a response of the adjusting motor selected from the group consisting of driving rotation direction, rotation speed, current, and voltage.

10. A voltage adjusting circuit system as claimed in claim 9, further comprising a central controller arranged to control said electrical machine control device in response to feedback selected from the group consisting of a load voltage, a motor current, and a combination of load current and motor current.

11. A voltage adjusting circuit system as claimed in claim 10, further comprising input and setting means for inputting control parameters to said central controller according to which said adjusting motor response to changes in the voltage across the load is further controlled to thereby further control said voltage adjustment by the adjusting motor.

12. A voltage adjusting circuit system as claimed in claim 8, further comprising a central controller arranged to control said electrical machine control device in response to feedback selected from the group consisting of a load voltage, a motor current, and a combination of load current and motor current.

13. A voltage adjusting circuit system as claimed in claim 1, wherein the active control means further comprises an electrical machine control device arranged to control a response of the adjusting motor selected from the group consisting of driving rotation direction, rotation speed, current, and voltage.

14. A voltage adjusting circuit system as claimed in claim 13, further comprising a central controller arranged to control said electrical machine control device in response to feedback selected from the group consisting of a load voltage, a motor current, and a combination of load current and motor current.

15. A voltage adjusting circuit system as claimed in claim 14, further comprising input and setting means for inputting control parameters to said central controller according to which said adjusting motor response to changes in the voltage across the load is further controlled to thereby further control said voltage adjustment by the adjusting motor.

* * * * *